(12) United States Patent
Yu et al.

(10) Patent No.: US 9,576,323 B2
(45) Date of Patent: Feb. 21, 2017

(54) SYSTEM FOR FACILITATING MULTI-CHANNEL PURCHASE OF FSA ELIGIBLE ITEMS

(75) Inventors: James Yu, Glenview, IL (US); Matthew Danforth, Chicago, IL (US); Cornelius Geer, Evanston, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 1601 days.

(21) Appl. No.: 12/886,060

(22) Filed: Sep. 20, 2010

(65) Prior Publication Data

US 2012/0072295 A1 Mar. 22, 2012

(51) Int. Cl.
| | |
|---|---|
| G06Q 20/20 | (2012.01) |
| G06Q 40/00 | (2012.01) |
| G06Q 10/10 | (2012.01) |
| G06Q 20/12 | (2012.01) |
| G06Q 30/04 | (2012.01) |
| G06Q 30/06 | (2012.01) |
| G06Q 20/04 | (2012.01) |
| G06Q 20/40 | (2012.01) |

(52) U.S. Cl.
CPC .......... *G06Q 40/10* (2013.01); *G06Q 10/1057* (2013.01); *G06Q 20/12* (2013.01); *G06Q 20/20* (2013.01); *G06Q 30/04* (2013.01); *G06Q 30/06* (2013.01)

(58) Field of Classification Search
CPC ...... G06Q 20/20; G06Q 20/04; G06Q 20/204; G06Q 20/40
See application file for complete search history.

(56) References Cited

U.S. PATENT DOCUMENTS

| | | | | |
|---|---|---|---|---|
| 8,788,281 B1 * | 7/2014 | Pletz | ..................... | G06F 19/328 705/2 |
| 8,939,356 B2 * | 1/2015 | Pourfallah | ........... | G06Q 20/347 235/375 |
| 2002/0055887 A1 * | 5/2002 | Seguin | ................... | G06Q 30/06 705/26.8 |
| 2002/0198831 A1 * | 12/2002 | Patricelli | ................ | G06Q 20/10 705/40 |
| 2006/0113376 A1 * | 6/2006 | Reed | ..................... | G06Q 20/04 235/379 |
| 2006/0149670 A1 * | 7/2006 | Nguyen | ................. | G06Q 20/10 705/39 |

(Continued)

OTHER PUBLICATIONS

Drugstore.com, FSA store, 1 page.

*Primary Examiner* — Ryan Zeender
*Assistant Examiner* — Dana Amsdell
(74) *Attorney, Agent, or Firm* — McAndrews, Held & Malloy, Ltd.

(57) ABSTRACT

In a database that is associated with the retailer POS system, inventory is flagged as being FSA-eligible and a retailer POS system is programmed to support FSA debit card auto-adjudication, i.e., the retailer POS system is IIAS certified. The FSA-eligible information that is stored in the retailer POS database is also used to flag for a customer FSA-eligible items presented to the user online, e.g., in an online catalog. When an FSA-eligible item is purchased on-line or at a retailer POS, the FSA debit card information is captured and the purchase transaction is processed by the retailer POS system so the customer has easy access to FSA purchases via either channel.

4 Claims, 2 Drawing Sheets

(56) References Cited

U.S. PATENT DOCUMENTS

| | | | |
|---|---|---|---|
| 2006/0167720 A1* | 7/2006 | Harrison | G06Q 10/10 705/2 |
| 2007/0007335 A1* | 1/2007 | Cracchiolo | G06Q 40/08 235/380 |
| 2007/0011025 A1* | 1/2007 | Cracchiolo | G06Q 20/10 705/2 |
| 2007/0175985 A1* | 8/2007 | Barnes | G06Q 20/04 235/381 |
| 2007/0185803 A1* | 8/2007 | Harrison | G06F 19/328 705/36 T |
| 2007/0194108 A1* | 8/2007 | Kalappa | G06Q 40/00 235/381 |
| 2008/0097903 A1* | 4/2008 | Boyle | G06Q 20/02 705/40 |
| 2008/0183627 A1* | 7/2008 | Harrison | G06F 19/328 705/67 |
| 2008/0197188 A1* | 8/2008 | Jagatic | G06Q 20/20 235/380 |
| 2009/0055224 A1* | 2/2009 | Kashyap | G06Q 50/22 705/4 |
| 2009/0083065 A1* | 3/2009 | Unland | G06F 19/328 705/2 |
| 2010/0010901 A1* | 1/2010 | Marshall | G06Q 20/105 705/17 |
| 2010/0010909 A1* | 1/2010 | Marshall | G06Q 20/12 705/26.1 |
| 2010/0100484 A1* | 4/2010 | Nguyen | G06Q 20/10 705/44 |

\* cited by examiner

SYSTEM FOR FACILITATING MULTI-CHANNEL PURCHASE OF FSA ELIGIBLE ITEMS

BACKGROUND

The subject invention generally relates to retail services and, more particularly, relates to a system for facilitating multi-channel purchase of FSA eligible items.

Medical Flexible Spending Accounts (FSAs), Health Reimbursement Accounts (HRAs), and Health Savings Accounts (HSAs)—individually and collectively referred to hereinafter as FSAs—are company sponsored benefits that allow employees to purchase medical services, prescriptions, over-the-counter medical products, and other items with pre-tax dollars, as designated by the Internal Revenue Service (IRS). The IRS has approved a process of automation, called auto-adjudication, that allows a customer to have FSA-eligible items authenticated at the point-of-sale (POS). This automation is made possible by the retailer's POS system which identifies and validates FSA-eligible items with the customer's use of an FSA linked debit card (usually a Visa or MasterCard debit card, just like a checking account) to make the purchase, i.e., the retailer POS system is certified as an Inventory Information Authentication System (IIAS). With the use of an IIAS, when FSA-eligible items are purchased, records associated with the validated items are transmitted back to the customer's FSA account and the purchase amount is deducted from any available FSA account balance. This allows the customer to provide the required documentation back to the plan administrator without the onerous task of collecting and filing receipts and awaiting reimbursement from the account.

SUMMARY

The following describes a system and method for facilitating multi-channel purchase of FSA eligible items, i.e., at a retail store and/or online. To this end, in a database that is associated with the retailer POS system, inventory is flagged as being FSA-eligible and the retailer POS system is programmed to support FSA debit card auto-adjudication, i.e., the retailer POS system is IIAS certified. The FSA-eligible information that is stored in the retailer POS database is also used to flag for a customer FSA-eligible items presented to the user online, e.g., in an online catalog. When an FSA-eligible item is purchased on-line or at a retailer POS, the FSA debit card information is captured and the purchase transaction is processed by the retailer POS system so the customer has easy access to FSA purchases via either channel.

While the forgoing provides a general overview of some of the various features and functionalities of the subject invention, a better understanding of the objects, advantages, features, properties, and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which.

DETAILED DESCRIPTION

Figure 1:
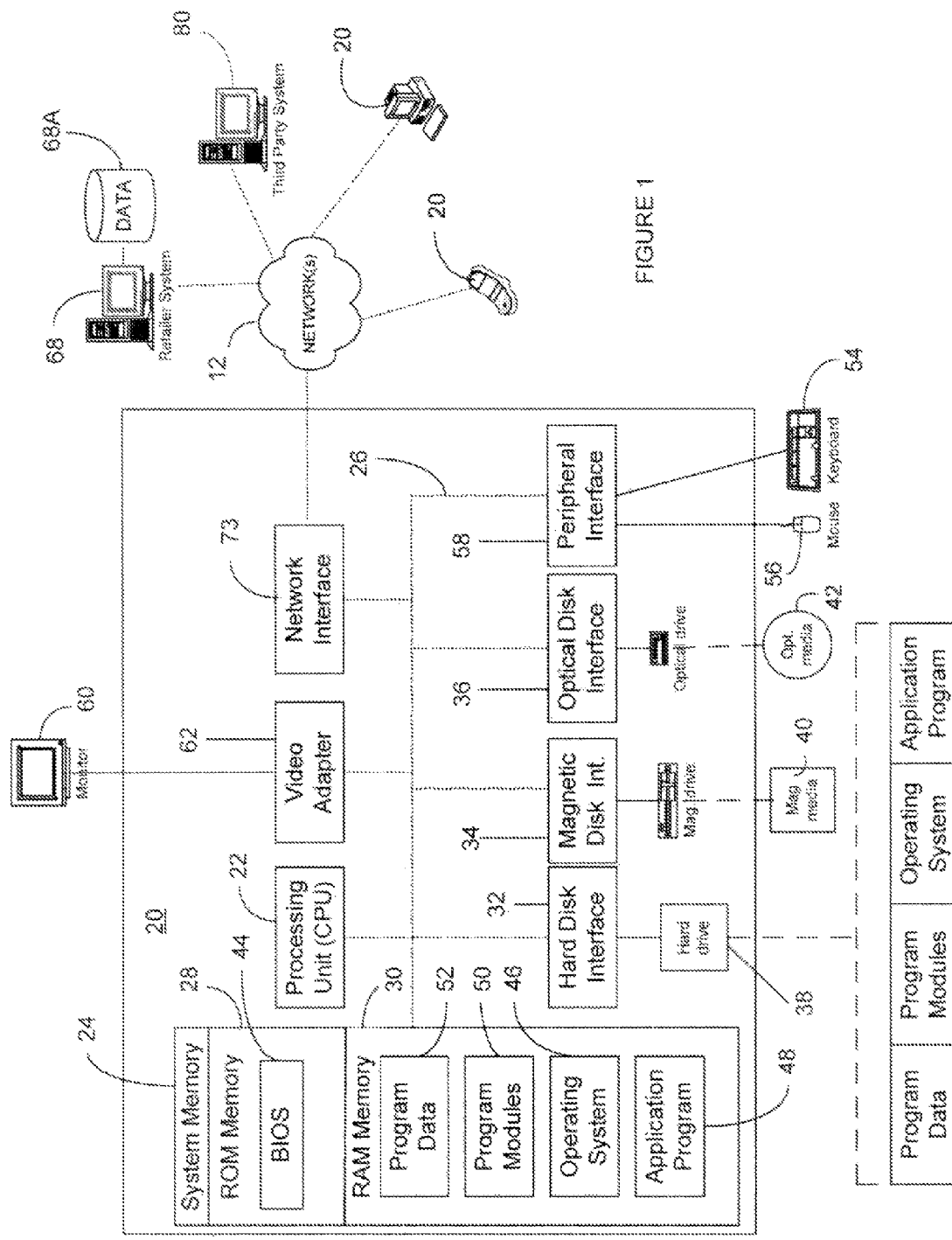
FIG. 1 illustrates in block diagram form components of an exemplary system that functions to facilitate multi-channel purchase of FSA eligible items.

With reference to the figures, the following describes a system and method for facilitating multi-channel purchase of FSA eligible items wherein both online retail channels and physical or "brick and mortar" POS retail channels are linked. To this end, an exemplary system, illustrated in FIG. 1, includes a processing device 20 whereby a customer may access an online retail channel hosted by a retailer system 68 to, among other things, view and purchase items being offered for sale by a retailer. While illustrated in the exemplary form of a personal computer, it is to be understood that the processing device 20 may be embodied in any type of device having the ability to execute instructions such as, by way of example only, a personal-digital assistant ("PDA"), a cellular telephone, or the like. Furthermore, while described and illustrated in the context of a single processing device 20, those skilled in the art will also appreciate that the various tasks described hereinafter may be practiced in a distributed environment having multiple processing devices linked via a local or wide-area network, such as the Internet, whereby the executable instructions may be associated with and/or executed by one or more of the multiple processing devices.

More particularly, to provide a means for a customer to access the online retail channel (and to perform various other tasks as necessary) the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated physically embodied computer-readable media allow for the storage of instructions, data structures, program modules, and the like for execution by the processing unit 22 of the processing device 20. Those skilled in the art will further appreciate that other types of physically embodied computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories. Meanwhile, the program modules that may be stored in one or more of the memory/media devices may include a basic input/output system (BIOS) 44 which contains the basic routines that help to transfer information between elements within the processing device 20, such as during start-up, an operating system 46, one or more applications programs 48 (such as a Web browser), other program modules 50, and/or program data 52.

To allow a user to enter commands and information into the processing device 20, e.g., to search for and purchase items, input devices such as a touch pad or keyboard 54 and/or a pointing device 56 are provided. While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

As noted above, the processing device 20 may also utilize logical connections to one or more remote processing devices, such as a retailer system 68 having associated data repository 68A. As will be understood, the data repository 68A may maintain a database of items that are being sold by the retailer, customer information, financial information, and the like type of data used in commerce. While the retailer system 68 has been illustrated in the exemplary form of a server computer, it will be appreciated that the retailer system 68 may, like processing device 20, be any type of device having processing capabilities. Similarly, it will be appreciated that the retailer system 68 need not be implemented as a single device but may be implemented in a manner such that the tasks performed by the retailer system 68 are distributed amongst a plurality of processing devices/databases located at the same or different geographical locations and linked through a communication network. Additionally, the retailer system 68 may have logical connections to other systems third party systems 80 via the network 12 and, via such connections, will be associated with functions that are supported by and data repositories that are linked to such other third party systems. Such third party systems may include, without limitation, systems of banking, credit, or other financial institutions, e.g., FSA account holding institutions, systems of third party providers of goods and/or services, systems of shipping/delivery companies, systems that support social networking, etc.

For performing tasks as needed, the retailer system 68 may include many or all of the elements described above relative to the processing device 20. In addition, the retailer system 68 would generally include executable instructions that are likewise stored on physically embodied memory devices for, among other things, supporting online retail channel services, supporting physical retail channel POS services, maintaining records, etc. To this end, the retailer system 68 may additionally include links to point-of-sale devices, e.g., cash registers, that are located within one or more retail stores and the like without limitation.

Communications between the processing device 20 and the retailer system 68 may be exchanged via a further processing device, such as a network router, that is responsible for network routing. Communications with the network router may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) associated with the retailer system 68.

As noted above, the subject invention, particularly the retailer system 68, functions to support a system that facilitates multi-channel purchasing of FSA-eligible items. For this purpose, the retailer POS system component of the retailer system 68 is IIAS certified and items in a database that is associated with the retailer POS system are flagged "yes" or "no" for FSA-eligibility. When items are scanned during checkout at a retailer POS that is linked to the retailer POS system a separate total for those items that are FSA-eligible is maintained by the retailer POS system. If an FSA debit card is then presented for payment at the retailer POS, the retailer POS system will cause the FSA debit card to be charged, but for no more than the FSA-eligible item total. If there are other items that are being purchased (or if the FSA debit card did not cover the costs for all eligible items), the retailer POS system will require the customer to present another form of payment, such as cash, check, credit card, or debit card at the retailer POS, to pay for the remaining items.

Figure 2:
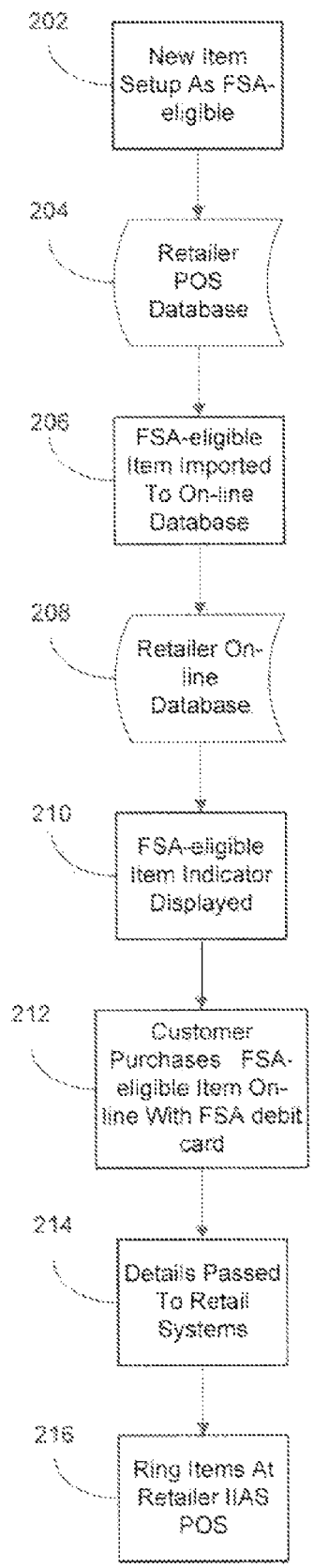
FIG. 2 illustrates a flow diagram of an exemplary method by which on-line purchases of FSA eligible items is supported.

Turning now to FIG. 2, to facilitate the online purchasing of FSA-eligible items, when an item is setup 202 in the retailer system as being FSA-eligible, the FSA-eligibility attribute in the corresponding item record in the retailer POS system database will be flagged 204 to indicate the FSA-eligibility in accordance with the IISA certification of the retailer POS system. The FSA-eligible attribute of the item is then exported 206 to the corresponding item record in the database that is associated with the online retail system component of the retailer system 208. As a result, when a customer uses the online retail channel to access the item by means of the online retail system component of the retailer system, the FSA-eligibility attribute of the record for the item will be examined and the item will accordingly be presented to the customer 210 with an indicator, e.g., a tag notice, that functions to inform the customer that the item is FSA-eligible.

In the event that the customer then proceeds to move forward with a purchase of the item via the online channel, e.g., the customer adds the item to an online shopping cart whereupon the online system component may respond by organizing the shopping cart and presenting to the customer a sub-total for all FSA-eligible items that have been placed into the shopping cart, the online system component will accordingly request from the customer the necessary payment information, i.e., their FSA debit card information and information for a second payment method in the event that the FSA debit card information cannot be validated 212. The transaction information, e.g., items to be purchased, FSA-eligibility flags for the items, and payment information received from the customer via the online system component, is then passed 214 to the retail POS system component of the retail system, preferably as encrypted data, whereupon the transaction information is verified and processed 216 as generally described above. If the transaction information is verified and processed to completion, the purchased items may then be collected for delivery to the customer, held for pickup, etc. and the customer may also be provided with an online, emailed, or the like receipt which will further indicate the FSA items that were included in the online purchase transaction.

While various concepts have been described in detail, it will be appreciated by those skilled in the art that various modifications and alternatives to those concepts could be developed in light of the overall teachings of the disclosure. For example, those of skill in the art will appreciate that the ordering of the steps described herein and illustrated in the figures can be modified without departing from the scope of the invention claimed hereinafter. Similarly, those of skill the art will appreciate that certain of the steps described herein may be considered to be optional. Yet further, while various aspects of the invention have been described in the context of functional modules and components, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of the modules used to perform the various described functions is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person knowledgeable in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A system for facilitating multi-channel purchasing of FSA eligible items, comprising:
   a retail store located point-of-sale (POS) device;
   a retail POS system in communication with the POS device having an associated retail system data repository, the retail system data repository storing data indicative of a plurality of items and corresponding Flexible Spending Account (FSA) purchasing eligibility for the plurality of items, the retail POS system being Inventory Information Authentication System (IIAS) certified whereby, upon one or more items being presented for purchase at the POS device, the retail POS system identifies the one or more items and uses the data stored in the retail system data repository to validate the one or more items as being FSA-eligible for purchase with a customer's FSA linked debit card; and
   an online retail system in communication with the retail POS system for presenting via an online channel items available for purchase, for indicating when items are FSA-eligible for purchase, for receiving payment information, including FSA linked debit card information, in response to a customer's indicated desire to purchase one or more items via the online channel, and for communicating the payment and item information to the retail POS system whereby the retail POS system identifies the one or more items and uses the data stored in the retail system data repository to validate the one or more items as being FSA-eligible for purchase with a customer's FSA linked debit card; wherein the online retail system has an associated online data repository; and wherein the online data repository was exported from the retail system data repository.

2. The system as recited in claim 1, wherein the associated online data repository stores data indicative of an online plurality of items and corresponding FSA purchasing eligibility for the online plurality of items, and the online retail system uses the data in the online data repository to indicate when items are FSA-eligible for purchase.

3. The system as recited in claim 2, wherein the online system further provides a customer with a receipt listing FSA eligible items purchased.

4. The system as recited in claim 2, wherein the retail system data repository tracks FSA eligible items purchased by a customer at the POS device and via the online channel.

* * * * *